United States Patent
Lunttila et al.

(10) Patent No.: US 9,078,262 B2
(45) Date of Patent: *Jul. 7, 2015

(54) SIGNALLING OF CHANNEL INFORMATION

(71) Applicant: Cellular Communications Equipment LLC, Plano, TX (US)

(72) Inventors: Timo Erkki Lunttila, Espoo (FI); Klaus Ingemann Pedersen, Aalborg (DK); Frank Frederiksen, Klarup (DK)

(73) Assignee: Cellular Communications Equipment LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,544

(22) Filed: Oct. 20, 2014

(65) Prior Publication Data

US 2015/0036636 A1    Feb. 5, 2015

Related U.S. Application Data

(63) Continuation of application No. 13/637,222, filed as application No. PCT/EP2010/053919 on Mar. 25, 2010, now Pat. No. 8,867,472.

(51) Int. Cl.
*H04W 4/00* (2009.01)
*H04W 72/04* (2009.01)
*H04L 5/00* (2006.01)
*H04W 72/00* (2009.01)
*H04L 1/00* (2006.01)

(52) U.S. Cl.
CPC ......... *H04W 72/0453* (2013.01); *H04L 1/0026* (2013.01); *H04L 1/0027* (2013.01); *H04W 72/042* (2013.01); *H04L 5/0057* (2013.01)

(58) Field of Classification Search
CPC ........... H04W 72/0453; H04W 72/042; H04L 1/0026; H04L 1/0027; H04L 5/0057
See application file for complete search history.

(56) References Cited

U.S. PATENT DOCUMENTS 8,644,182 B2 * 2/2014 Seo et al. ............... 370/252
8,665,804 B2 * 3/2014 Meylan et al. ............ 370/329

(Continued)

FOREIGN PATENT DOCUMENTS

WO    WO 2009/088225 A2    7/2009
WO    WO 2011/015331       2/2011

OTHER PUBLICATIONS

3GPP TS 36.212 V9.0.0 (Dec. 2009), 3rd Generation Partnership Project; Technical Specification Group Radio Access Network; Evolved Universal Terrestrial Radio Access (E-UTRA); Multiplexing and channel coding (Release 9), Dec. 2009, 61 pgs.

(Continued)

*Primary Examiner* — Clemence Han
(74) *Attorney, Agent, or Firm* — Martin & Ferraro, LLP

(57) ABSTRACT

An apparatus and a method are described by which a request for providing aperiodic channel information with respect to a selected downlink component carrier of a plurality of component carriers is received, the selected downlink component carrier is determined, channel information with respect to the selected downlink component carrier is established, and the channel information with respect to the selected downlink component carrier is sent.

31 Claims, 2 Drawing Sheets

(56) References Cited

U.S. PATENT DOCUMENTS

| | | | |
|---|---|---|---|
| 8,724,488 B2* | 5/2014 | Shin et al. | 370/252 |
| 8,724,574 B2* | 5/2014 | Yang et al. | 370/329 |
| 2009/0257385 A1 | 10/2009 | Meylan et al. | |
| 2010/0098012 A1* | 4/2010 | Bala et al. | 370/329 |
| 2010/0113078 A1* | 5/2010 | Farajidana et al. | 455/507 |
| 2010/0246561 A1 | 9/2010 | Shin et al. | |
| 2011/0317652 A1* | 12/2011 | Kim et al. | 370/329 |
| 2012/0106495 A1 | 5/2012 | Yang et al. | |
| 2012/0120838 A1* | 5/2012 | Farajidana et al. | 370/252 |
| 2012/0269153 A1 | 10/2012 | Seo et al. | |
| 2013/0010740 A1* | 1/2013 | Kim et al. | 370/329 |
| 2013/0089043 A1 | 4/2013 | Lunttila et al. | |
| 2015/0036633 A1 | 2/2015 | Lunttila et al. | |

OTHER PUBLICATIONS

CATT, "CQI feedback for LTE-A", R1-100014, 3GPP TSG RAN WGI Meeting #59bis, Valencia, Spain, Jan. 18-22, 2010, 7 pgs.

NTT DoCoMo, "Proposed SID on LTE-Advanced," RP-080137, 3GPP TSG RAN #39, Puerto Vallarta, Mexico, Mar. 4-7, 2008, 5 pgs.

Panasonic, HTC Corporation, "Aperiodic CQI Reporting for Carrier Aggregation," R1-100372, 3GPP TSG-RAN WG 1 Meeting 59bis, Jan. 18-22, 2010, 2 pgs.

Qualcomm Incorporated, "CQI Feedback for Multicarrier Operation", R1-101478, 3GPP TSG RAN WGI #60, San Francisco, USA, Feb. 22-26, 2010, 3 pgs.

Siemens AG, "Downlink PDCCH Signaling and CQI Measurement for LTE-A Bandwidth Extension" Abstract only, Feb. 13, 2009, 1 pg.

* cited by examiner

SIGNALLING OF CHANNEL INFORMATION

BACKGROUND OF THE INVENTION

The present application is a continuation of Ser. No. 13/637,222, filed Sep. 25, 2012 with an assigned §371(c) acceptance date of Nov. 14, 2012, which is pending; which is a U.S. National Stage Entry of PCT/EP2010/053919, filed Mar. 25, 2010; all of which are incorporated by reference herein.

1. Field of the Invention

The present invention relates to an apparatus, method and computer program product for aperiodic channel quality indication for carrier aggregation.

2. Related Background Art

The following meanings for the abbreviations used in this specification apply:

3GPP $3^{rd}$ generation partnership project
CA Carrier Aggregation
CC Component carrier
CIF Carrier Indicator Field
CQI Channel quality indicator
CRC Cyclic Redundancy Check
CSI Channel State information (includes e.g. CQI, PMI and RI)
DCI Downlink Control Information
DL Downlink
DRX/DTX Discontinuous transmission/detection
eNode-B LTE base station (also referred to as eNB)
FDPS Frequency Domain Packet Scheduling
LTE Long term evolution
LTE-A LTE-Advanced
MAC Medium Access Control
MCS Modulation and Coding Scheme
MIMO Multiple Input Multiple Output
NDI New Data Indicator
PDCCH Physical Downlink Control Channel
PMI Precoding Matrix Indicator
PRB Physical resource block
PUCCH Physical Uplink Control Channel
PUSCH Physical Uplink Shared Channel
RI Rank Indicator
RRC Radio Resource Control
SU-MIMO Single User Multiple Input Multiple Output
UE User equipment
UL Uplink Some embodiments of the present invention relate, for example, to LTE-Advanced system which will most likely be part of 3GPP LTE Rel-10. More specifically, the focus is on Channel State Information (CSI) feedback signalling with carrier aggregation. It is, however, noted that the embodiments may be applied to other systems and releases as well.

LTE-Advanced will be an evolution of LTE Rel-8 system fulfilling the ITU-R requirements for IMT-Advanced. 3GPP approved a new Study Item on LTE-Advanced in RAN#39 (March 2008). Carrier aggregation will be one key technology component required to meet the bandwidth and peak data rate requirements set for the new system.

As described above, embodiments of the present invention relate to component carrier aggregation (or channel bonding), where the total system bandwidth consists of set of component carriers as illustrated in FIG. 3. FIG. 3 shows an example of carrier aggregation with non-contiguous bands, in which the total system bandwidth contains a set of component carriers $BW_1$, $BW_2$, . . . , $BW_N$, having carrier frequencies $f_1$, $f_2$, . . . , $f_N$.

The ongoing standardization of LTE-Advanced in 3GPP (currently in the study item phase) assumes carrier aggregation to form bandwidths of up to 100 MHz by having aggregation of up to 5 component carriers of 20 MHz each. Different transport blocks with different modulation and coding schemes (MCS) can be transmitted on the different component carriers, although transmitted to the same user. In order to facilitate such schemes with efficient frequency domain link adaptation scheduling, the UEs must provide frequency selective channel state information (CSI) feedback. CSI may include channel quality indicators (CQI), Precoding Matrix Indicators (PMI), Rank Indicators(RI) and/or channel frequency or impulse response and/or channel covariance matrix. Additionally the CSI report may include an indication of the component carrier or the subband the report refers to.

In order to achieve gains from frequency dependent packet scheduling (FDPS) it is necessary to obtain accurate information about the frequency domain behaviour of the propagation channel. To enable FDPS, several frequency selective CSI reporting modes were added into the LTE Rel-8 specifications. The size of the CSI reports depends on the reporting mode, system bandwidth and rank. The maximum size of the CSI report in LTE Rel-8 is 64 bits (mode 3-1, 20 MHz BW, rank >1) excluding CRC bits.

When using multiple component carriers, this would lead to large reports. Hence, the size of the reports should be reduced.

SUMMARY OF THE INVENTION

Thus, it is an object of the present invention to overcome the above problem of the prior art.

According to several embodiments of the present invention, an apparatus and a method are provided by which a request for providing aperiodic channel information with respect to a selected downlink component carrier of a plurality of component carriers is received, the selected downlink component carrier is determined, channel information with respect to the selected downlink component carrier is established, and the channel information with respect to the selected downlink component carrier is sent.

According to several embodiments of the present invention, an apparatus and a method are provided, by which a request for providing aperiodic channel information with respect to a selected downlink component carrier of a plurality of component carriers is generated, and the request is sent.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As mentioned in the introductory part of the present application, the size of channel state information (CSI) or channel quality indicators (CQI) reports should be reduced in connection with carrier aggregation, in which a plurality of component carriers (CC) is used.

It has been specified in the 3GPP RAN WG#1 that in LTE Rel-8 and Rel-9, the eNodeB can in any subframe (excluding the ones when the UE in configured to DRX/DTX) force the UE to send an aperiodic CSI report on PUSCH. That is, in contrast to a periodic CSI report, an aperiodic CSI report is sent by the UE when it is triggered to do so.

The aperiodic CSI request is triggered with one specific bit in the uplink grant (using DCI format 0, as specified in 36.212). Furthermore, it is possible to ask for the aperiodic CSI transmission without any simultaneous UL data transmission, i.e. aperiodic CSI only. Each UE is always semi-statically configured via RRC signalling to use one aperiodic CSI reporting mode (before explicit configuration is sent, a default mode is assumed depending on the transmission mode).

With carrier aggregation the need for elaborate CSI remains. LTE-Advanced (Rel-10) will support at most 5 DL CCs. Hence the straightforward expansion of Rel-8 reporting for multiple CCs would result in very large reports (e.g. 5*64 bits=320 bits). This is not desirable from the Uplink signalling point of view. Firstly, such high overhead limits uplink capacity considerably. Secondly, in many cases it is not possible to guarantee sufficient UL coverage for such large payloads. Hence it's clear some compression methods need to be considered to reduce the UL signalling burden.

Thus, in order to make efficient use of aggregated spectrum, aperiodic CSI reporting needs to be tailored for the support of multiple Component Carriers (CC). Embodiments of the present invention report focus on the related DL signalling aspects.

According to embodiments of the present invention, an approach is taken according to which it is possible to request for a detailed, aperiodic channel information (e.g., CSI) report for some specific DL CC (plus potentially some coarse wideband CSI for other CCs). Embodiments describe DL control signalling mechanisms for how to realize this.

Figure 1:
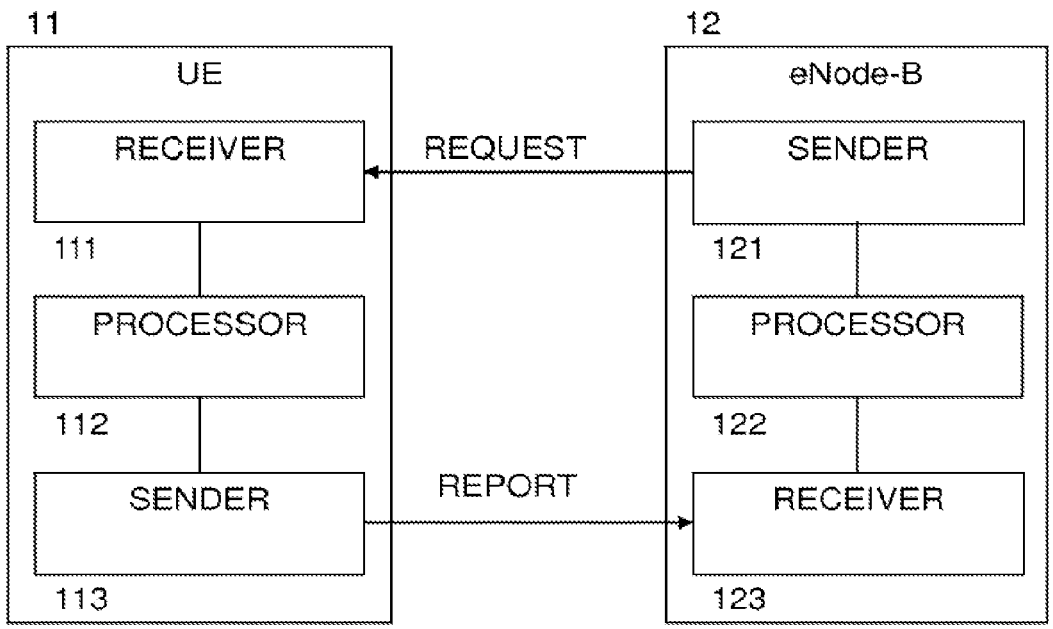
FIG. 1 a structure of a user equipment (UE) and an eNode-B according to some embodiments of the present invention.

In the following, some embodiments are described with respect to FIG. 1. In particular, FIG. 1 shows structures of the network elements as used in some of the embodiments described in the following.

Reference number 11 shows an user equipment (UE) as an example for an apparatus carrying out processes according to the embodiments. In particular, the UE comprises a receiver (receiving means) 111 which is configured to receive a request (e.g., an aperiodic CQI or CSI trigger as described in the following) for providing aperiodic channel information with respect to a selected downlink component carrier of a plurality of component carriers. The UE further comprises a processor (processing means) 112 which is configured to determine the selected downlink component carrier and to establish channel information with respect to the selected downlink component carrier. That is, the processor determines the component carrier to be monitored or evaluated, for example based on information as will be described in the following. Then, the processor monitors the channel in order to detect the channel quality of the component carriers or the like. Moreover, the UE comprises a sender (sending means) 113 which is configured to send the channel information (e.g., aperiodic CSI report or feedback).

It is noted that the sender 111, the processor 112 and/or the sender 113 may be provided as one unit, e.g., such that the processor 112 receives and/or sends the corresponding messages, requests etc. to/from a transmitting unit of the UE or the like. Moreover, the processor 112 can be part of a central processor of the UE, and/or can be configured to carry out further functions.

Reference number 12 shows an eNode-B as an example for a network control element or an apparatus which sends the request for providing aperiodic channel information described above. The eNode-B 12 comprises a processor (processing means) 122 configured to generate a request (e.g., an aperiodic CQI or CSI trigger as described in the following) for providing aperiodic channel information with respect to a selected downlink component carrier of a plurality of component carriers. Moreover, a sender (sending means) 121 is configured to send the request. Furthermore, the eNode-B 12 may comprise a receiver (receiving means) 123 configured to receive aperiodic channel information sent in response to the request for providing aperiodic channel information.

Thus, the sender 121 of the eNodeB sends a request or trigger (as indicated in FIG. 1 by the upper arrow), the processor 112 detects the channel state and/or channel quality on the selected component carrier, and the sender 113 of the UE 12 sends the corresponding report to the receiver 123 of the eNode-B (a indicated by the lower arrow in FIG. 1).

It is noted that, similar as in case of the UE 11, the sender 121, the processor 122 and/or the receiver 123 may be provided as one unit, e.g., such that the processor 122 receives and/or sends the corresponding messages, requests etc. to/from a transmitting unit of the eNode-B or the like. Moreover, the processor 122 can be part of a central processor of the eNode-B, and/or can be configured to carry out further functions.

Figure 2A:
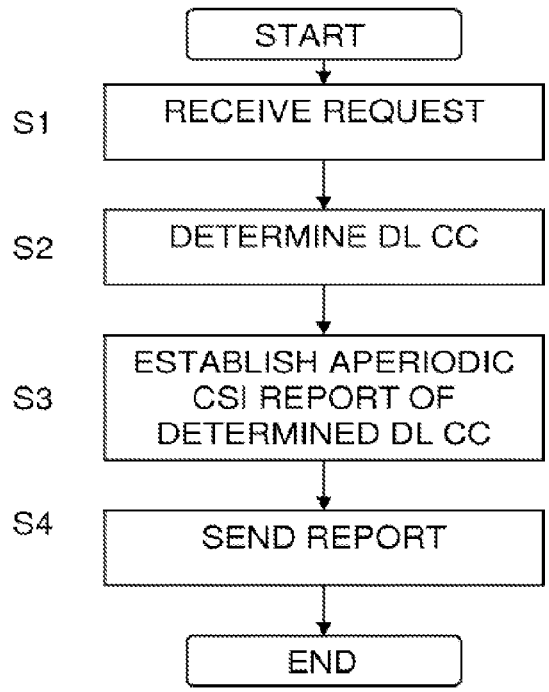
FIGS. 2A and 2B show processes carried out by a user equipment (UE) and an eNode-B according to some embodiments of the present invention.
Figure 2B:
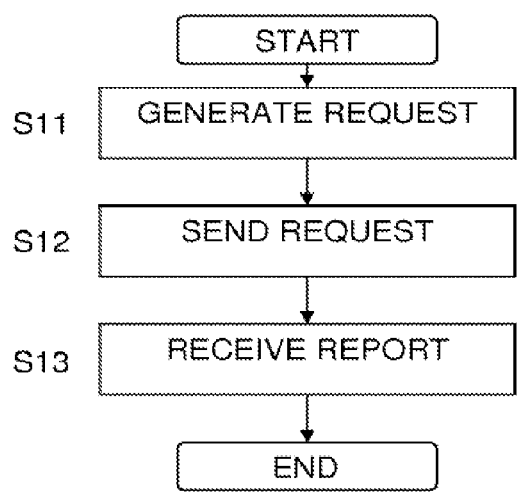

FIGS. 2A and 2B show methods according to embodiments of the present invention.

FIG. 2A shows a process carried out on by an apparatus such as an user equipment, for example. In step S1, a request (e.g., an aperiodic CQI or CSI trigger as described in the following) for providing aperiodic channel information with respect to a selected downlink component carrier of a plurality of component carriers is received. In step S2, the selected downlink component carrier is determined. In step S3, channel information with respect to the selected downlink component carrier is established, and in step S4, the channel information with respect to the selected downlink component carrier is sent (e.g., to network control element such as an eNode-B).

FIG. 2B shows a process carried out by a network control element such as an eNode-B, for example. In step S11, a request for providing aperiodic channel information with respect to a selected downlink component carrier of a plurality of component carriers is generated, and in step S12, the request is sent.

Moreover, the method may comprise a step S13, in which aperiodic channel information sent in response to the request for providing aperiodic channel information is received.

Thus, according to embodiments of the present invention, signalling for Aperiodic CSI feedback with carrier aggregation is achieved.

Hence, according to embodiments of the present invention, DL signalling mechanisms and rules are defined which are required for aperiodic CSI report triggering with Carrier Aggregation. A few alternative/complementary options are listed below with respect to certain embodiments. The common nominator for all the alternatives is that they provide a way to indicate for which DL CC the detailed frequency selective CSI report is derived. Additionally wideband reports for other DL CC in the DL CC monitoring set can be reported simultaneously.

Figure 3:
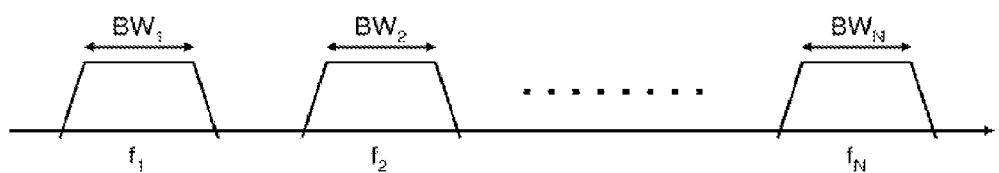
FIG. 3 shows an example of carrier aggregation.

The selected downlink component carrier described above may be the primary component carrier in a CC set, or an arbitrary selected one of the set. That is, for example, any one of the component carriers $BW_1$ to $BW_N$ shown in FIG. 3 can be predetermined and indicated to the UE as the selected downlink component carrier by the different measures as described below.

It is noted that the channel information described above may comprise CSI or CQI, as mentioned above. However, the embodiments are not limited to the specific definitions of CSI and CQI.

It is noted that according to the embodiments described below, an aperiodic CSI trigger (as an example for the request for providing aperiodic channel information) is sent within an uplink (UL) grant. However, the embodiments are not limited to this, and the request (or trigger) may be sent in other suitable ways.

Moreover, in the first to sixth embodiments described in the following, the basic structure and functions as described above are applied. Hence, only the different aspects of the embodiments are described.

According to the first embodiment, the detailed frequency selective aperiodic CSI report is derived from the DL CC that carried the UL grant with the aperiodic CSI trigger.

That is, when the UE 11 receives UL grant on which the trigger (request for providing aperiodic channel information) on a particular component carrier, it knows that it has to detect the channel state or quality information on this particular component carrier.

Thus, the indication which particular component carrier is selected is provided by sending the request, in this case the UL grant including the request, on this particular component carrier.

According to the second embodiment, in the UL grant used for triggering the aperiodic CSI report there is provided an indicator pointing out for which CC the frequency selective report should be calculated. For example, the indicator may comprise 1-3 bit, so that, e.g., five component carriers as specified by LTE-A may be indicated.

In particular, this indicator may be similar to the carrier indicator field (CIF) used for scheduling data across CCs.

Alternatively, some unused fields in the UL grant may be used. For instance, Rel'8 DCI format 0 will have a single padding bit, which could potentially be used for indicating whether the primary component carrier should be reported, or whether one of the secondary CCs should be reported. For example, the secondary CCs could be indicated by using a hopping pattern.

For example, a hopping pattern as described in document "Downlink PDCCH signaling and CQI measurement for LTE-A bandwidth extension", No. IPCOM000178173D published on ww.IP.com. In detail, a secondary component carrier to be monitored is indicated by $C_n$ . . . , and for M component carriers $C_0$, $C_1$ . . . $C_M$, the value of n can be calculated as follows:

$n = (SFN + UE\ ID)\ \mathrm{mod}\ M$ where SFN is the system frame number and UE ID is a UE identification number (usually 16 Bit). Then $C_n$ is the selected/used secondary component carrier. In LTE 10, M could be 4, when all available CCs (5) are used (i.e., one primary CC and four secondary CCs).

Thus, summarizing, according to the second embodiment, a particular indicator is used for specifying the component carrier on which the channel state should be detected.

According to the third embodiment, whenever the UE receives an UL grant with request to send Aperiodic CSI, it shall send the configured CSI report for the primary DL CC. That is, in this case the component carrier for which the CSI report is to be established predetermined, namely the primary component carrier.

Here the configured CSI report (configured via RRC) may be frequency selective.

In addition, the UE could send also wideband CSI for other configured and activated CCs.

According to the fourth embodiment, a combined indication of the scheduled UL CC and the DL CC for which to derive the frequency selective CSI report is included into the UL grant. That is, according to the fourth embodiment a possibility to simultaneously indicate also the DL CC to report is taken into account in the UL grant CIF design.

This could, for instance, happen during the design of the potential new UL resource grant that is considered for SU-MIMO (single-user multiple input multiple output). This grant will have a completely new design, and would potentially leave room for more advanced indications of the CSI (or CQI) reporting mode.

According to the fifth embodiment, the DL CC for which the frequency selective Aperiodic CSI report is derived is configured semi-statically using higher layer signalling (e.g. RRC or MAC). That is, similar as according to the third embodiment, the component carrier for which the report is to be established is predetermined or preconfigured, so that the UE 12 knows which component carrier is to be evaluated when it receives the aperiodic trigger.

According to the sixth embodiment, unused portions of the UL grant are used in order to indicate the selected component carrier.

Namely, in the case when an aperiodic CSI report is requested to be transmitted without simultaneous UL data there will be some unused signalling bits/states in the UL grant (e.g. MCS, NDI and resource allocation signalling). Those can be utilized to indicate the DL CC for which the frequency selective CSI is measured and reported, so that the information for indicating the DL CC an be included in such unused signalling bits or states, or the some of the signalling bits or states can be reinterpreted with this information.

Thus, the following advantages are achieved by the embodiments as described above:

For the eNode-B the ability to request for a detailed Aperiodic CSI report for a desired CC is useful to complement efficient scheduling and link adaptation decisions. Examples include cases where the eNode-B only have data for a particular UE to be send on a single CC. For such cases it would be useful for the eNode-B to request CSI for the desired CC where the scheduling is about to happen.

Currently there is not a mechanism available to realize this—hence one needs to be standardized.

The solution as described above requires only minimized standardization effort since there is no need to define new CA specific reporting formats.

It is noted that some embodiments as described above are directed to LTE-A. However, LTE-A is only an example, and embodiments of the present invention may be applied on any radio access technology in which a system bandwidth is divided in sub-bands and component carriers are monitored with respect to channel quality.

According to a first aspect of several embodiments of the invention, an apparatus is provided which comprises a receiver configured to receive a request for providing aperiodic channel information with respect to a selected downlink component carrier of a plurality of component carriers, a processor configured to determine the selected downlink component carrier and to establish channel information with respect to the selected downlink component carrier, and a sender configured to send the channel information with respect to the selected downlink component carrier.

The first aspect may be modified as follows:

The processor may be configured to determine the selected downlink component carrier based on which component carrier carried the request for providing the aperiodic channel information.

The processor may be configured to determine the selected downlink component carrier based on an indicator sent with the request for providing aperiodic channel information.

The request for providing aperiodic channel information and the indicator may be included in an uplink grant.

The selected downlink component carrier may be a predetermined downlink component carrier, and the processor may be configured to establish channel information with respect to the predetermined downlink component carrier when the request for providing aperiodic channel state information is received.

The predetermined downlink component carrier may be a primary downlink component carrier.

The predetermined downlink component carrier may be configured using control signalling.

The predetermined downlink component carrier may be configured by a network control element.

The request for providing aperiodic channel information may be included in an uplink grant, wherein the uplink grant comprises a combined indication of a scheduled uplink component carrier and the selected downlink component carrier.

The combined indication may be included in a carrier indicator field.

The request for providing aperiodic channel information may be included an uplink grant, and wherein, when the aperiodic channel information is requested to be transmitted without simultaneous uplink data, the request for providing aperiodic channel information may be included in unused signalling bits or states, or some of the signalling bits or states are reinterpreted with the request for providing aperiodic channel information.

The processor may be configured to provide channel information for at least one of the other component carriers than the selected component carrier, and the sender may be configured to send the channel information for the at least one of the other component carriers.

The channel information for the at least one of the other component carriers may be a wideband channel information.

The at least one of the other component carriers may be configured using control signalling.

The at least one of the other component carriers may be configured using control signailing by a network control element.

The control signalling may be radio resource control signalling or medium access control signalling.

Information regarding the at least one of the other component carriers may be included in the request for providing aperiodic channel information.

The request for providing aperiodic channel information may be included in an uplink grant.

The sender may be configured to send the channel information to a network control element.

The network control element may be an eNode-B, a relay node or a home eNode-B.

The channel information may comprise channel state information and/or a channel quality indicator.

The apparatus may be or may be part of a user equipment.

According to a second aspect of several embodiments of the invention, an apparatus is provided which comprises a processor configured to generate a request for providing aperiodic channel information with respect to a selected downlink component carrier of a plurality of component carriers, and a sender configured to send the request.

The second aspect may be modified as follows:

The apparatus may further comprise a receiver configured to receive aperiodic channel information sent in response to the request for providing aperiodic channel information.

The sender may be configured to send the request for providing the aperiodic channel information on the component carrier for which the aperiodic channel information is to be provided.

The processor may be configured to generate an indicator for determining the selected downlink component carrier, and the sender may be configured to send the indicator with the request for providing aperiodic channel information.

The request for providing aperiodic channel information and the indicator may be included in an uplink grant.

The selected downlink component carrier may be a predetermined downlink component carrier.

The predetermined downlink component carrier may be a primary downlink component carrier.

The predetermined downlink component carrier may be configured using control signalling.

The control signalling may be radio resource control signalling or medium access control signalling.

The processor may be configured to include the request for providing aperiodic channel information in an uplink grant, wherein the uplink grant may comprise a combined indication of a scheduled uplink component carrier and the selected downlink component carrier.

The processor may be configured to include the combined indication in a carrier indicator field.

The processor may be configured to include the request for providing aperiodic channel information in an uplink grant, and to include, when the aperiodic channel information is requested to be transmitted without simultaneous uplink data, the request for providing aperiodic channel information in unused signalling bits or states, or some of the signalling bits or states may be reinterpreted with the request for providing aperiodic channel information.

The processor may be configured to generate a request for providing channel information for at least one of the other component carriers than the selected component carrier.

The channel information for the at least one of the other component carriers may be a wideband channel information.

The receiver may be configured to receive the aperiodic channel information from a user equipment.

The processor may be configured to include the request for providing aperiodic channel information in an uplink grant.

The apparatus may be a network control element or may be part of a network control element. The network control element may be an eNode-B.

The channel information may comprise channel state information and/or a channel quality indicator.

According to a third aspect of several embodiments of the invention, a method is provided which comprises receiving a request for providing aperiodic channel information with respect to a selected downlink component carrier of a plurality of component carriers, determining the selected downlink component carrier, establishing channel information with respect to the selected downlink component carrier, and sending the channel information with respect to the selected downlink component carrier.

The third aspect may be modified as follows:

The selected downlink component carrier may be determined based on which component carrier carried the request for providing the aperiodic channel information.

The selected downlink component carrier may be determined based on an indicator sent with the request for providing aperiodic channel information.

The request for providing aperiodic channel information and the indicator may be included in an uplink grant.

The selected downlink component carrier may be a predetermined downlink component carrier, and the channel information may be established with respect to the predetermined downlink component carrier when the request for providing aperiodic channel information is received.

The predetermined downlink component carrier may be a primary downlink component carrier.

The predetermined downlink component carrier may be configured using control signalling.

The predetermined downlink component carrier may be configured by a network control element.

The request for providing aperiodic channel information may be included in an uplink grant, wherein the uplink grant may comprise a combined indication of a scheduled uplink component carrier and the selected downlink component carrier.

The combined indication may be included in a carrier indicator field.

The request for providing aperiodic channel information may be included an uplink grant, and wherein, when the aperiodic channel information is requested to be transmitted without simultaneous uplink data, the request for providing aperiodic channel information may be included in unused signalling bits or states, or some of the signalling bits or states may be reinterpreted with the request for providing aperiodic channel information.

The method may further comprise providing channel information for at least one of the other component carriers than the selected component carrier, and sending the channel information for the at least one of the other component carriers.

The channel information for the at least one of the other component carriers may be a wideband channel information.

The at least one of the other component carriers may be configured using control signalling.

The at least one of the other component carriers may be configured by a network control element.

The control signalling may be radio resource control signalling or medium access control signalling.

Information regarding the at least one of the other component carriers may be included in the request for providing aperiodic channel information.

The channel information may be sent to a network control element.

The network control element may be an eNode-B, a relay node or a home eNode-B.

The request for providing aperiodic channel information may be included in an uplink grant.

The method may be carried out by a user equipment or a part thereof.

The channel information may comprise channel state information and/or a channel quality indicator.

According to a fourth aspect of several embodiments of the invention, a method is provided which comprises generating a request for providing aperiodic channel information with respect to a selected downlink component carrier of a plurality of component carriers, and sending the request.

The fourth aspect may be modified as follows:

The method may further comprise receiving aperiodic channel information sent in response to the request for providing aperiodic channel information.

The request for providing the aperiodic channel information may be sent on the component carrier for which the aperiodic channel information is to be provided.

The method may further comprise generating an indicator for determining the selected downlink component carrier, wherein the indicator is sent with the request for providing aperiodic channel information.

The request for providing aperiodic channel information and the indicator may be included in an uplink grant.

The selected downlink component carrier may be a predetermined downlink component carrier.

The predetermined downlink component carrier may be a primary downlink component carrier.

The predetermined downlink component carrier may be configured using control signalling.

The control signalling may be radio resource control signalling or medium access control signalling.

The method may further comprise including the request for providing aperiodic channel information included in an uplink grant, wherein the uplink grant comprises a combined indication of a scheduled uplink component carrier and the selected downlink component carrier.

The combined indication may be included in a carrier indicator field.

The method may further comprise including the request for providing aperiodic channel information in an uplink grant, and, including the request for providing aperiodic channel information in unused signalling bits or states or some of the signalling bits or states are reinterpreted with the request for providing aperiodic channel information, when the aperiodic channel information is requested to be transmitted without simultaneous uplink data.

The method may further comprise generating a request for providing channel information for at least one of the other component carriers than the selected component carrier.

The channel information for the at least one of the other component carriers may be a wideband channel information.

The aperiodic channel information may be received from a user equipment.

The request for providing aperiodic channel information may be included in an uplink grant.

The method may be carried out by a network control element or a part thereof, wherein the network control element may be an eNode-B.

The channel information may comprise channel state information and/or a channel quality indicator.

According to a fifth aspect of several embodiments of the present invention, a computer program product is provided which comprises code means for performing a method according to any one of the third and fourth aspects and their modifications when run on a computer.

The computer program product is embodied on a computer-readable medium.

The computer program product may be directly loadable into an internal memory of the computer.

According to a sixth aspect of several embodiments of the invention, an apparatus is provided which comprises means for receiving a request for providing aperiodic channel information with respect to a selected downlink component carrier of a plurality of component carriers, means for determining the selected downlink component carrier and to establish channel information with respect to the selected downlink component carrier, and means for sending the channel information with respect to the selected downlink component carrier.

The sixth aspect may be modified as follows:

The apparatus may comprise means for determining the selected downlink component carrier based on which component carrier carried the request for providing the aperiodic channel information.

The apparatus may comprise means for determining the selected downlink component carrier based on an indicator sent with the request for providing aperiodic channel information.

The apparatus may comprise means for providing channel information for at least one of the other component carriers than the selected component carrier, and means for sending the channel information for the at least one of the other component carriers.

According to a seventh aspect of several embodiments of the invention, an apparatus is provided which comprises means for generating a request for providing aperiodic channel information with respect to a selected downlink component carrier of a plurality of component carriers, and means for sending the request.

The seventh aspect may be modified as follows:

The apparatus may further comprise means for receiving aperiodic channel information sent in response to the request for providing aperiodic channel information.

The apparatus may comprise means for sending the request for providing the aperiodic channel information on the component carrier for which the aperiodic channel information is to be provided.

The apparatus may comprise means for generating an indicator for determining the selected downlink component carrier, and means for sending the indicator with the request for providing aperiodic channel information.

The apparatus may comprise means for including the request for providing aperiodic channel information in an uplink grant, wherein the uplink grant may comprise a combined indication of a scheduled uplink component carrier and the selected downlink component carrier.

The apparatus may comprise means for including the combined indication in a carrier indicator field.

The apparatus may comprise means for including the request for providing aperiodic channel information in an uplink grant, and for including, when the aperiodic channel information is requested to be transmitted without simultaneous uplink data, the request for providing aperiodic channel information in unused signalling bits or states, or some of the signalling bits or states may be reinterpreted with the request for providing aperiodic channel information.

The apparatus may comprise means for generating a request for providing channel information for at least one of the other component carriers than the selected component carrier.

The apparatus may comprise means for receiving the aperiodic channel information from a user equipment.

The apparatus may comprise means for including the request for providing aperiodic channel information in an uplink grant.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto.

Rather, it is the intention that all variations and modifications be included which fall within the spirit and scope of the appended claims.

What is claimed is:

1. An apparatus comprising:
a processor configured to generate a request for providing aperiodic channel information with respect to a selected downlink component carrier of a plurality of non-contiguous component carriers; and
a transmitting unit configured to send the request for providing the aperiodic channel information on a component carrier for which the aperiodic channel information is to be provided.

2. The apparatus according to claim 1, further comprising a receiver configured to receive the aperiodic channel information sent in response to the request for providing the aperiodic channel information.

3. The apparatus according to claim 1, wherein the processor is further configured to generate an indicator for determining the selected downlink component carrier, and the transmitting unit is configured to send the indicator with the request for providing the aperiodic channel information.

4. The apparatus according to claim 3, wherein the request for providing the aperiodic channel information and the indicator are included in an uplink grant.

5. The apparatus according to claim 1, wherein the selected downlink component carrier is a predetermined downlink component carrier.

6. The apparatus according to claim 5, wherein the predetermined downlink component carrier is a primary downlink component carrier.

7. The apparatus according to claim 5, wherein the predetermined downlink component carrier is configured using control signaling.

8. The apparatus according to claim 1, wherein the processor is further configured to include the request for providing the aperiodic channel information in an uplink grant, the uplink grant comprising a combined indication of a scheduled uplink component carrier and the selected downlink component carrier.

9. The apparatus according to claim 8, wherein the processor is further configured to include the combined indication in a carrier indicator field.

10. The apparatus according to claim 1, wherein the processor is further configured to include the request for providing the aperiodic channel information in an uplink grant.

11. The apparatus according to claim 10, wherein the processor is further configured to include, when the aperiodic channel information is requested to be transmitted without simultaneous uplink data, the request for providing the aperiodic channel information in unused signaling bits or states of the uplink grant.

12. The apparatus according to claim 11, wherein the processor is further configured to reinterpret, when the aperiodic channel information is requested to be transmitted without the simultaneous uplink data, the unused signalling bits or states of the uplink grant with the request for providing the aperiodic channel information.

13. The apparatus according to claim 1, wherein the processor is further configured to generate a request for providing channel information for at least one of the other component carriers of the plurality of non-contiguous component carriers other than the selected component carrier.

14. The apparatus according to claim 13, wherein the channel information for the at least one of the other component carriers is a wideband channel information.

15. The apparatus according to claim 1, wherein the processor is further configured to include the request for providing the aperiodic channel information in an uplink grant.

16. A method comprising:
generating a request for providing aperiodic channel information with respect to a selected downlink component carrier of a plurality of non-contiguous component carriers; and
sending the request for providing the aperiodic channel information on a component carrier for which the aperiodic channel information is to be provided.

17. The method according to claim 16, further comprising receiving the aperiodic channel information sent in response to the request for providing the aperiodic channel information.

18. The method according to claim 16, further comprising generating an indicator for determining the selected downlink component carrier, the indicator being sent with the request for providing the aperiodic channel information.

19. The method according to claim 18, wherein the request for providing the aperiodic channel information and the indicator are included in an uplink grant.

20. The method according to claim 16, wherein the selected downlink component carrier is a predetermined downlink component carrier.

21. The method according to claim 20, wherein the predetermined downlink component carrier is a primary downlink component carrier.

22. The method according to claim 20, wherein the predetermined downlink component carrier is configured using control signaling.

23. The method according to claim 16, further comprising including the request for providing the aperiodic channel information in an uplink grant, the uplink grant comprising a combined indication of a scheduled uplink component carrier and the selected downlink component carrier.

24. The method according to claim 23, wherein the combined indication is included in a carrier indicator field.

25. The method according to claim 16, further comprising including the request for providing the aperiodic channel information in an uplink grant.

26. The method according to claim 25, further comprising including the request for providing the aperiodic channel information in unused signaling bits or states of the uplink grant.

27. The method according to claim 26, further comprising reinterpreting, when the aperiodic channel information is requested to be transmitted without the simultaneous uplink data, the unused signalling bits or states of the uplink grant with the request for providing the aperiodic channel information.

28. The method according to claim 16, further comprising generating a request for providing channel information for at least one of the other component carriers of the plurality of non-contiguous component carriers other than the selected component carrier.

29. The method according to claim 28, wherein the channel information for the at least one of the other component carriers is a wideband channel information.

30. The method according to claim 16, wherein the request for providing the aperiodic channel information is included in an uplink grant.

31. A non-transitory computer-readable medium including code for performing a process to be executed on a computer, the process comprising:

generating a request for providing aperiodic channel information with respect to a selected downlink component carrier of a plurality of non-contiguous component carriers; and sending the request for providing the aperiodic channel information on a component carrier for which the aperiodic channel information is to be provided.

* * * * *